(12) United States Patent
Ricci et al.

(10) Patent No.: US 8,169,898 B2
(45) Date of Patent: May 1, 2012

(54) MODULAR TELEPHONE

(75) Inventors: Christopher P. Ricci, Cherry Hills Village, CO (US); Howard L. Speight, Houston, TX (US)

(73) Assignee: Avaya Inc., Basking Ridge, NJ (US)

( * ) Notice: Subject to any disclaimer, the term of this patent is extended or adjusted under 35 U.S.C. 154(b) by 225 days.

(21) Appl. No.: 12/568,001

(22) Filed: Sep. 28, 2009

(65) Prior Publication Data

US 2011/0077932 A1    Mar. 31, 2011

(51) Int. Cl.
*G01R 31/08* (2006.01)
(52) U.S. Cl. ......... 370/229; 370/252; 455/73; 455/90.3; 455/550.1
(58) Field of Classification Search .................. None
See application file for complete search history.

(56) References Cited

U.S. PATENT DOCUMENTS

| | | | |
|---|---|---|---|
| 4,899,373 A | 2/1990 | Lee et al. | |
| 5,303,291 A | 4/1994 | Takagi et al. | |
| 5,392,346 A | 2/1995 | Hassler et al. | |
| 5,513,256 A | 4/1996 | Komuro | |
| 5,557,665 A | 9/1996 | Yamamoto | |
| 5,724,417 A | 3/1998 | Bartholomew et al. | |
| 6,563,814 B2 | 5/2003 | Rowan et al. | |
| 6,714,802 B1 | 3/2004 | Barvesten | |
| 6,781,925 B2 | 8/2004 | Nuovo | |
| 6,823,055 B1 | 11/2004 | Mayer et al. | |
| 6,968,161 B2 | 11/2005 | Inomata et al. | |
| 7,095,986 B2 | 8/2006 | Mager | |
| 7,120,140 B1 | 10/2006 | Dylag et al. | |
| 7,149,297 B2 | 12/2006 | Idoni et al. | |
| 7,151,825 B2 | 12/2006 | Idoni et al. | |
| 7,333,472 B2 | 2/2008 | Yang et al. | |
| 7,391,762 B2 | 6/2008 | Ko | |
| 7,412,271 B2 | 8/2008 | Cheng | |
| 2006/0099939 A1* | 5/2006 | Uchikawa et al. | ............. 455/418 |
| 2011/0077932 A1* | 3/2011 | Ricci et al. | ....................... 703/24 |

OTHER PUBLICATIONS

Nortel, "Nortel Secure 'Office-on-a-Stick' Protects Remote Network Access From Any PC", (Aug. 27, 2008), pp. 1-3.
Microsoft, "Step-byStep Guide for Setting Up VPN-based Remote Access in a Test Lab", (2009), pp. 1-52.
Microsoft, "Virtual Private Networking with Windows Sever 2003: Overview", ( Mar. 2003), pp. 1-27.

* cited by examiner

Primary Examiner — Robert Wilson
(74) Attorney, Agent, or Firm — Sheridan Ross P.C.

(57) ABSTRACT

A self-configuring communication system includes a portable memory device that stores personalization data. The self-configuring communication system includes a local instrument. The local instrument includes an interface for the portable memory device. The local instrument includes a processor to establish a link through the interface to the portable memory device without intervention and, upon establishing the link, to execute a program to configure the local instrument to emulate a telephone described by the personalization data.

23 Claims, 1 Drawing Sheet

MODULAR TELEPHONE

BACKGROUND

Telephones provide a number of features that users rely upon. Contact lists, calendars, call logs, favorites, and other such features have become central to the operation of many offices and homes.

At the same time, technology has arisen to make an office worker's telephone environment available at the worker's home or at some other location remote from his or her office. For example, a worker can log on to his or her office computer through a Virtual Private Network ("VPN") and view his or her computer screen almost exactly as it appears in the office, including viewing any telephone management screens, contact lists, calendars, and other such features.

SUMMARY

In general, in one aspect, the invention features a self-configuring communication system. The self-configuring communication system includes a portable memory device that stores personalization data. The self-configuring communication system includes a local instrument. The local instrument includes an interface for the portable memory device. The local instrument includes a processor to establish a link through the interface to the portable memory device without intervention and, upon establishing the link, to execute a program to configure the local instrument to emulate a telephone described by the personalization data.

Implementations of the invention may include one or more of the following. The self-configuring communication system may further include a remote telephone system. The remote telephone system may include a VPN host to interface with the local instrument via a VPN client over a wide area network, the VPN client being disposed within the local instrument. The remote telephone system may include an internet protocol public branch exchange ("IP-PBX"). The remote telephone system may include a database containing telephone system personalization data. The remote telephone system may include a local area network that interconnects the VPN host, the IP-PBX, and the database. The self-configuring communication system may include a plurality of internet protocol telephones coupled to the IP-PBX. The self-configuring communication system may include a legacy public branch exchange ("L-PBX") coupled to the IP-PBX via a bridge. The self-configuring communication system may include a trunk line coupled to a public branch exchange selected from the group consisting of the IP-PBX or a legacy public branch exchange ("L-PBX"). The personalization data may include data useful to automatically initiate the VPN. The personalization data may include data to configure the program emulating the telephone so that it provides at least a subset of the functions of a user's office telephone. The functions of the user's office telephone may be selected from a group consisting of contacts, call log, favorites, voice mail, and presence indication.

In general, in another aspect, the invention features a method for locally emulating a telephone on a remote telephone system. The method includes detecting a portable memory device by a local device and, in response, launching a VPN client to interface with a VPN host via a network. The method includes connecting to a database via the VPN client and VPN host, the database containing data used to route telephone calls in the remote telephone system. The method includes changing the database so that an incoming call to the remote telephone system intended for a user's telephone is directed to the local device and an outgoing call from the local device is directed through the remote telephone system as if the outgoing call were being made from the user's telephone.

Implementations of the invention may include one or more of the following. The method may include reading personalization data from the portable memory device. Launching the VPN client may include using the personalization data. The method may include using the personalization data to emulate a functionality of the user's telephone on the local device.

In general, in another aspect, the invention features a telephone. The telephone includes a processor housed in a telephone housing. The processor is coupled to a touch screen display through which the telephone can be controlled, a network interface through which the telephone can connect to a local telephone system, a peripheral interface, and a processor memory. The telephone includes a handset coupled to the peripheral interface through which voice signals can be transmitted and received. The telephone includes a peripheral housed in a portable peripheral housing separate from the telephone housing, the peripheral being coupled to the peripheral interface. The telephone includes a software driver stored in a peripheral memory on the peripheral that, when the peripheral is coupled to the peripheral interface, is uploaded to the processor memory and is executed to exercise the functionality of the peripheral.

Implementations of the invention may include one or more of the following. The telephone may include a computer coupled to the processor. The computer may execute the software driver. The processor may execute the software driver. The telephone may include a network having at least one server. The telephone may include telephone applications stored on the at least one server that are uploaded to the processor memory through a network interface and selectively executed. The telephone may include personalization data that are uploaded to the processor memory and are used to personalize the telephone to a set of preferences. The telephone may include a soft phone application stored in the peripheral memory that communicates with a remote telephone system separate from the local telephone system to cause the telephone to appear to the remote telephone system to be a telephone coupled to the remote telephone system. The soft phone application may be executed by the processor. The soft phone application may be executed by a computer coupled to the telephone. The network interface may be an interface selected from the group consisting of a wireless network interface and a wired network interface. The network interface may be an interface selected from the group consisting of an Ethernet interface and an IEEE 802 interface. The peripheral interface may be an interface selected from the group consisting of a wireless interface and a wired interface. The peripheral interface may be an interface selected from the group consisting of a Blue Tooth interface and a USB interface.

In general, in another aspect, the invention features a method. The method includes coupling a peripheral to a telephone. The method includes downloading a software driver from the peripheral to the telephone. The method includes executing the software driver to exercise the functionality of the peripheral. The method includes coupling a computer to the telephone and executing the software driver on the computer. Executing the software driver to exercise the functionality of the peripheral includes selectively executing telephone applications. Executing the software driver to exercise the functionality of the peripheral includes using personalization data to personalize the telephone to a set of preferences. Executing the software driver to exercise the functionality of the peripheral includes communicating with a remote telephone system to cause the telephone to appear to the remote telephone system to be a telephone coupled to the remote telephone system.

DETAILED DESCRIPTION

A self-configuring communication system includes a portable memory device that carries information to personalize an appropriately equipped local instrument so that it is similar to an environment that the user wishes to emulate, such as the user's office or home telephone. The local instrument automatically detects the presence of the portable memory device and automatically, i.e., without intervention from the user, initiates communication with a remote system. Upon establishing a link with the remote system, the local instrument appears to the user, and to the outside world, to be the user's telephone.

Figure 1:
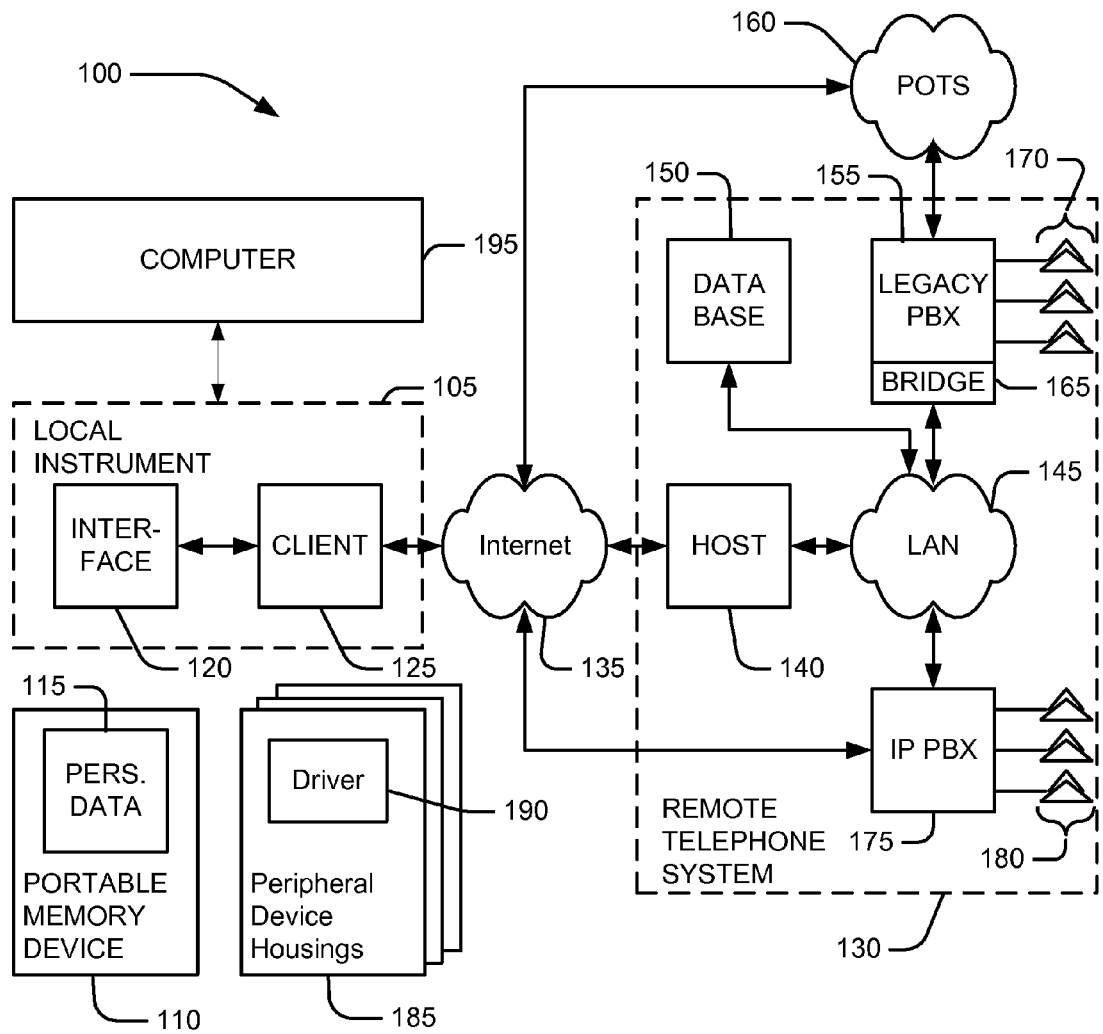
FIG. 1 is a block diagram of a self-configuring communication system.

One embodiment of a self-configuring communication system 100, illustrated in FIG. 1, includes a local instrument 105. In one embodiment, the local instrument 105 is a standard telephone, i.e., with a handset, a key pad, a display screen, special function keys, etc., that is modified to provide the capabilities described below. In one embodiment, the local instrument 105 is a telephone with a handset, key pad, etc., that is specially designed and manufactured to provide the capabilities described below. In one embodiment, the local instrument is a cellular telephone, such as an iPhone® manufactured by Apple Corporation, that provides many of the capabilities of a standard telephone but through a touch screen interface, with an application to provide the capabilities described below. In one embodiment, the local instrument is a computer, such as a desktop computer, a lap top computer, or one of the many varieties of similar machines, that runs software to emulate the functions of a telephone.

In one embodiment, the local instrument includes one or more peripheral devices, such as a headset, a keypad, a monitor, a touchscreen, a mouse, a touch pad, or any other such peripheral, connected wirelessly, i.e., by BlueTooth®, infrared, WIFI, or some other wireless technology, or through a wired interface.

The self-configuring communication system 100 further includes a portable memory device 110. In one embodiment, the portable memory device is 110 a "thumb" drive or some other form of solid state memory. In one embodiment, the portable memory device 110 is a memory on a cellular telephone. In one embodiment, the portable memory device 110 includes a Universal Serial Bus ("USB") connector through which it can interface to the local instrument 105. In one embodiment, the portable memory device 110 connects to the local instrument 105 through a wired or wireless interface.

In one embodiment, the portable memory device 110 includes a personalization data 115. In one embodiment, the personalization data 115 is stored on a solid state memory on the portable memory device 110. In one embodiment, the personalization data 115 is stored on a mechanical drive (i.e., a hard drive) on the portable memory device 110. In one embodiment, the portable memory device 110 includes an interface that accepts a memory card (not shown), such as those used in digital cameras, and the memory card will carry the personalization data 115. In such an arrangement, different users can use the same portable memory device 110 by changing the memory card.

Figure 2:
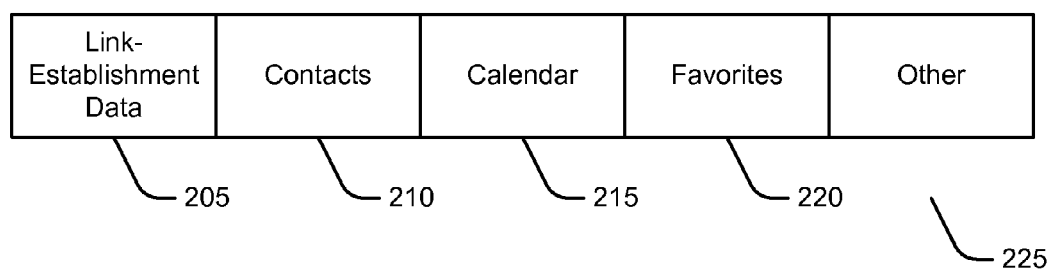
FIG. 2 illustrates personalization data that can be used with a self-configuring communication system.

In one embodiment, illustrated in FIG. 2, the personalization data 115 includes data 205 used to establish a Link with a remote access server, such as the user's office computer or home computer. In one embodiment, the Link follows the Point-to-Point Tunneling Protocol (PPTP). In one embodiment, the Link follows the Layer Two Tunneling Protocol (L2TP). In one embodiment, the Link follows the IPSec tunnel mode protocol. In one embodiment, the Link is a Virtual Private Network ("VPN").

In one embodiment, the link-establishment data 205 includes such information as a script to be run by the local instrument to configure it to establish the Link, the name or Internet Protocol ("IP") address of the Host, a script to initiate the Link, a certificate (if one is used on the Link), and/or other similar data. In one embodiment, the personalization data 115 includes a local version of the user's contacts 210, such as names, addresses, telephone numbers, email addresses, and the like. In one embodiment, the personalization data 115 includes a local version of the user's calendar 215, such as appointments, reminders and the like. In one embodiment, the personalization data 115 includes a local version of the user's favorites 220, such as browser favorites, telephone call favorites, speed-dial numbers, and the like. In one embodiment, the personalization data 115 includes other data 225, such as password key chains. In one embodiment, the personalization data 115 is encrypted and is protected by a password. In one embodiment, the other data 225 includes a call log of incoming and outgoing telephone calls. In one embodiment, the other data 225 includes ring tone preferences, including ring tone assignments for specific callers, screen appearances (i.e., what information appears on the screen—date, time, extension, caller ID, call log, call waiting information, etc.), display color choices, do-not-disturb selections, key assignments (i.e., which keys exercise which telephone functions), etc.

In one embodiment, the personalization data 115 stored on the portable memory device 110 is a subset of telephone system personalization data stored on a user's home or office telephone system. In one embodiment, the personalization data 115 stored on the portable memory device 110 is that portion of the telephone system personalization data relevant to one user. In one embodiment, the personalization data 115 stored on the portable memory device 110 is that portion of the telephone system personalization data relevant to a group of users, such as a group working on a single project or a group that is temporarily assigned to a remote location and sharing the same telephone.

In one embodiment, the local device 105 includes an interface 120 for the portable memory device 110. In one embodiment, the interface 120 includes a USB port. In one embodiment, the interface 120 includes a Blue Tooth transceiver. In one embodiment, the interface 120 includes firmware or software to establish a connection with the portable memory device 110. In one embodiment, the interface 120 includes firmware or software to scan for the presence of the portable memory device 110. In one embodiment, the interface 120 includes firmware or software to communicate with other devices in the local instrument 105, such as over a system bus or through peripheral interfaces, such as PCI chips.

In one embodiment, the local instrument includes a Client 125. In one embodiment, the Client 125 includes a processor. In one embodiment, the processor is hardware. In one embodiment, the processor is software or firmware. In one embodiment, the processor is a mixture of hardware and software or firmware.

In one embodiment, the Client 125 is coupled to the interface 120. In one embodiment, the coupling is by way of a bus. In one embodiment, the coupling is by way of a peripheral interconnect chip set.

In one embodiment, when the portable memory device 110 establishes contact with the interface 120 in the local instrument 105, through a USB connection or a Blue Tooth connection, or the like, the interface 120 detects the link-establishment data 205 and, without user intervention (i.e., without the user having to issue commands to, or respond to queries from, the local instrument 105), downloads the link-establishment data 205 and makes it available to the Client 125. In one embodiment, the Client 125, again without intervention by the user, uses the link-establishment data to establish the Link with a remote telephone system 130 through a wide area network 135, such as the Internet. In one embodiment, the user is given an opportunity to intervene by either approving or disapproving establishment of the Link.

In one embodiment, the personalization data 115 is used to configure the local instrument to emulate at least a subset of the functions of a user's telephone on the remote telephone system 130. In one embodiment, the configuring function is accomplished without intervention from the user. In one embodiment, the functions of the user's telephone that are emulated include one or more of:

contacts (i.e., displaying the names, addresses, telephone numbers, email addresses, and other contact information);

call log (i.e., a log of incoming and outgoing calls, etc.);

favorites (i.e., favorite phone numbers, Internet browser favorites, etc.);

voice mail (i.e., number of voice mail messages, length of each, who from, etc.);

presence indication (i.e., an indication of whether the user is in the office, out of the office, in the office but not available, etc.).

In one embodiment, the remote telephone system includes a Host 140 with which the Client 125 in the local instrument 105 establishes the link. In one embodiment, the Client 140 allows access to a Local Area Network ("LAN") 145. In one embodiment, the LAN 145 is an Ethernet LAN. In one embodiment, the LAN 145 is complex with multiple switches and/or hubs. In one embodiment, the LAN 145 is simple with a single switch or hub. In one embodiment, the LAN 145 is a wired LAN. In one embodiment, the LAN 145 is a wireless LAN. In one embodiment, the LAN 145 is a combination of a wired LAN and a wireless LAN.

In one embodiment, a database 150 is coupled to the LAN 145. In one embodiment, the database 150 contains personalization data for users in the company or home that owns, operates, or leases the remote telephone system. In one embodiment, the personalization data stored in the database 150 is a super set of the data stored for a user on the portable memory device. In one embodiment, the personalization data stored in the database 150 is identical to the data stored for a user on the portable memory device. In one embodiment the database 150 is a relational database system.

In one embodiment a Legacy private branch exchange ("PBX") 155 is coupled to the LAN 145. In one embodiment, the Legacy PBX 155 is a traditional PBX that handles routing and switching of analog or digital (but not Internet Protocol ("IP")) telephone signals. In one embodiment, the Legacy PBX 155 includes a voice mail system. In one embodiment, the Legacy PBX 155 includes caller identification technology and other similar legacy telephone system features.

In one embodiment, the Legacy PBX 155 is coupled to the Plain Old Telephone System ("POTS") 160, which is the traditional non-IP telephone system. In one embodiment the POTS is coupled to the wide area network 135.

In one embodiment, the Legacy PBX 155 is coupled to the LAN through a bridge 165. In one embodiment, the bridge 165 provides an interface between the traditional technology of the Legacy PBX 155 and the IP-based technology of the LAN.

In one embodiment, a set of legacy telephones 170 is coupled to the legacy PBX. In one embodiment, the legacy telephones 170 are the traditional non-IP telephone sets.

In one embodiment, an Internet Protocol PBX ("IP PBX") 175 is coupled to the LAN 145 and also to the wide area network 135. In one embodiment, the IP PBX 175 receives calls from the wide area network 135 and routes them based on IP addresses typically included with the call. In one embodiment, the IP PBX provides typical IP PBX features including call waiting, call forwarding, call transfer, voice mail, and other such features.

In one embodiment, a set of IP telephones 180, such as voice over IP ("VOIP") telephones or soft telephones, is coupled to the IP PBX 170. In one embodiment, the IP telephones 180 transfer signals over a network, which may be the LAN 145, rather than via traditional analog or digital signals, as is the case with the Legacy PBX 155.

In one embodiment, the database 150 includes data that defines how incoming calls are to be routed. For example, a telephone call may arrive to the IP PBX that includes a direct dial number. In one embodiment, the IP PBX will query the database 150 to determine how to route the call. If for example, the call is intended for one of the legacy telephones 170, the database will respond with that information and the IP PBX will route the call through the LAN 145, the bridge 165, and the Legacy PBX 155 to the desired legacy telephone 170. If the call is intended for one of the IP telephones 180, the database 150 will respond with that information and the IP PBX will route the call to the desired IP telephone 180. Incoming calls to the Legacy PBX 155 will be treated similarly except that the Legacy PBX 155 will communicate with the database 150 by way of the bridge 165.

In one embodiment, once the Link is established, the local instrument 105 will modify the database 150 so that calls intended for the user or group of users located near the local instrument will be routed to the local instrument rather than to the remote telephone system's 130 telephones 170 or 180 typically used by the user or group of users.

In one embodiment, the database 150 is restored to its original state when one of the following events occurs: (1) the local instrument 105 indicates over the link that the session is over, or (2) the Host 140 detects that the Link has been interrupted. In one embodiment, the local instrument 105 will decide that a session is over when one of the following events occurs: (1) the local instrument loses contact with the portable memory device 110, or (2) a user indicates that the session is over through an interaction with the local instrument 105, such as a key stroke, a combination of key strokes, or some other similar indication. In one embodiment, the database 150 is not restored to its original state upon the occurrence of the above events but instead retains its revised state.

In one embodiment, the local instrument 105 includes a processor housed in a telephone housing (indicated by the dashed box in the figure). In one embodiment, the processor is coupled to a touch screen display through which the telephone can be controlled. That is, the touch screen can be used to initiate telephone-like functions, such as taking the telephone off hook, hanging up the phone, conferencing, forwarding, accessing speed dial functionality, and other such functions. In one embodiment, the touch screen is housed in the telephone housing. In one embodiment, the touch screen is not housed in the same telephone housing as the processor but is housed in one of a plurality of peripheral device housings 185.

In one embodiment, the processor is coupled to a network interface device (i.e., a device that implements an Ethernet interface, an interface meeting IEEE 802.11a, b, c, n, or any other similar standard, a wireless network interface, or a wired network interface). In one embodiment, the network interface device is housed in the telephone housing. In one embodiment, the network interface device is not housed in the same telephone housing as the processor but is housed in one of a plurality of the peripheral device housings 185. In one embodiment, the network interface device allows the local instrument to be interfaced to a local telephone system (not shown). For example, in one embodiment, the local instrument is in a users' hotel room and connects to the hotel's network through the network interface device. In that example, the local instrument could receive calls over the hotel's telephone system and from the user's office by way of the Link described above.

In one embodiment, the processor is coupled to a peripheral interface device such as the interface 120 described above. In one embodiment, the peripheral interface device is housed in the telephone housing. In one embodiment, the peripheral interface device is not housed in the same telephone housing as the processor but is housed in one of the plurality of peripheral device housings 185.

In one embodiment, the processor is coupled to a processor memory. In one embodiment, the processor memory is used for short term memory, i.e., as a register. In one embodiment, the processor memory is used for long term memory, such as for storing program instructions. In one embodiment, the processor memory is housed in the telephone housing. In one embodiment, the processor memory is not housed in the same telephone housing as the processor but is housed in one of the plurality of peripheral device housings 185.

In one embodiment, the processor is coupled to a handset through which voice signals can be transmitted and received. In one embodiment, the handset is separate from the telephone housing but is wired to it as in a traditional telephone. In one embodiment, the handset is housed in one of the plurality of peripheral device housings 185.

In one embodiment, the processor is coupled to another peripheral device that is stored in a peripheral device housing and that performs typical telephone or computer operations, such as a printer, a scanner, a speaker phone, a tablet and other similar peripheral devices.

In one embodiment, a software driver 190 is stored in a memory located in one of the peripheral device housings. In one embodiment, when the peripheral housed in one of the peripheral device housings 185 is coupled to the peripheral interface, i.e., interface 120, the driver 190 is automatically uploaded to a memory accessible to the processor and is executed to exercise the functionality of the peripheral. In the case of a thumb drive, for example, "functionality of the peripheral" means storage and retrieval. If the thumb drive contains applications, the thumb drive will also include a "software driver" (i.e., a mini operating system with drivers for the display, the network interface and the peripheral interface) that allows execution of the applications. If the peripheral is a keyboard or key pad, for example, the driver is a keyboard driver allowing the keys to be read and interpreted.

In one embodiment, the local instrument 105 is coupled to a computer 195. In one embodiment, the local instrument 105 is coupled to the computer 195 through the network interface device described above. In one embodiment, the local instrument 105 is coupled to a computer 195 through the peripheral interface device described above. In one embodiment the computer 195 is a desktop computer. In one embodiment, the computer 195 is a laptop computer. In one embodiment, the computer 195 is a mainframe computer. In one embodiment, the computer 195 executes the software driver rather than the processor located in the telephone housing. For example, in one embodiment the local instrument is a peripheral card that plugs into a bus in the computer 195, that interfaces with the peripheral devices housed in the peripheral device housings 185 and provides the software driver to the computer for execution.

In one embodiment, a telephone application, such as one of the One-X applications developed and sold by the assignee of this application, are stored in the remote telephone system 130, such as, for example, in the database 150. In one embodiment, the telephone applications are downloaded from the remote telephone system to the computer through the Link and executed. In one embodiment, the telephone applications are downloaded from the remote telephone system to the local instrument and executed by the processor. In one embodiment, the selection of a telephone application to run is made by touching an icon on a touch screen.

In one embodiment, "telephone applications" means any application that can be executed on the hardware suite available with the telephone. In one embodiment, "telephone applications" are approved by a governing committee before they can be uploaded to the memory coupled to the processor, similar to the screening that is done by Apple on applications for the iPhone or iTouch.

Whenever the word "coupled" is used herein, it means either a direct connection or an indirect connection.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A self-configuring communication system comprising:
   a portable memory device that stores personalization data;
   a local instrument comprising:
      an interface in communication with the portable memory device;
      a processor adapted to:
         establish a link through the interface to the portable memory device without interventions;
         upon establishing the link, execute a program to emulate a telephone described by the personalization data;
         execute a VPN client;
   a remote telephone system in communication with the local instrument, the remote telephone system comprising:
      a VPN host to interface with the VPN client over a wide area network;
      an internet protocol public branch exchange ("IP-PBX");

a database containing telephone system personalization data; and a local area network that interconnects the VPN host, the IP-PBX, and the database.

2. The self-configuring communication system of claim 1 further comprising: a plurality of internet protocol telephones coupled to the IP-PBX.

3. The self-configuring communication system of claim 1 further comprising: a legacy public branch exchange ("L-PBX") coupled to the IP-PBX via a bridge.

4. The self-configuring communication system of claim 1 further comprising: a trunk line coupled to a public branch exchange selected from the group consisting of the IP-PBX or a legacy public branch exchange ("L-PBX").

5. The self-configuring communication system of claim 1, wherein the personalization data comprises data useful to automatically initiate the VPN client.

6. The self-configuring communication system of claim 1, wherein the telephone is a user's office telephone, and wherein the personalization data comprises data to configure the program to emulate at least a portion of functionality of the user's office telephone.

7. The self-configuring communication system of claim 6, wherein the functionalities of the user's office telephone includes one or more of contacts, call log, favorites, voice mail, and presence indication.

8. A method for configuring a local telephone to emulate a remote telephone on a remote telephone system, the method comprising:

detecting a portable memory device by a local device;

in response to detecting the portable memory device, launching a VPN client to interface with a VPN host via a network;

the VPN client connecting to a database via the VPN host, the database containing data used to route telephone calls in the remote telephone system;

the VPN client changing the database to:
route an incoming call, intended for the remote telephone on the remote telephone system, to the local device; and
route an outgoing call, from the local device, through the remote telephone system as if the outgoing call were being made from the remote telephone.

9. The method of claim 8 further comprising: reading personalization data from the portable memory device.

10. The method of claim 9 wherein: launching the VPN client comprises using the personalization data.

11. The method of claim 9, wherein the remote telephone is a user's telephone on the remote telephone system, and the method further comprising: using the personalization data to emulate the user's telephone on remote system.

12. A telephone comprising:

a touch screen display through which the telephone can be controlled;

a processor housed in a telephone housing and coupled to the touch screen display;

a network interface through which the telephone can connect to a local telephone system;

a peripheral interface;

a processor memory;

a handset coupled to the peripheral interface through which voice signals can be transmitted and received;

a peripheral housed in a portable peripheral housing separate from the telephone housing, the peripheral being coupled to the peripheral interface; and a software driver stored in a peripheral memory on the peripheral, wherein when the software driver is uploaded to the processor memory and executed by the processor, the software driver configures the functionality of the peripheral.

13. The telephone of claim 12 further comprising: a computer coupled to the processor; and the computer to execute the software driver.

14. The telephone of claim 12 wherein the processor executes the software driver.

15. The telephone of claim 12 further comprising: a network having at least one server; telephone applications stored on the at least one server that are uploaded to the processor memory through a network interface and selectively executed.

16. The telephone of claim 12 further comprising: personalization data that are uploaded to the processor memory and are used to personalize the telephone to a set of preferences.

17. The telephone of claim 12 further comprising: a soft phone application stored in the peripheral memory that communicates with a remote telephone system separate from the local telephone system to cause the telephone to appear to the remote telephone system to be a telephone coupled to the remote telephone system.

18. The telephone of claim 17 wherein the soft phone application is executed by the processor.

19. The telephone of claim 17 wherein the soft phone application is executed by a computer coupled to the telephone.

20. The telephone of claim 12 wherein the network interface is an interface selected from the group consisting of a wireless network interface and a wired network interface.

21. The telephone of claim 12 wherein the network interface is an interface selected from the group consisting of an Ethernet interface and an IEEE 802 interface.

22. The telephone of claim 12 wherein the peripheral interface is an interface selected from the group consisting of a wireless interface and a wired interface.

23. The telephone of claim 12 wherein the peripheral interface is an interface selected from the group consisting of a Blue Tooth interface and a USB interface.

* * * * *